Dec. 8, 1936.   E. H. SCHULTZ   2,063,762
ENDLESS TRACK STRUCTURE
Original Filed April 14, 1933   2 Sheets-Sheet 1
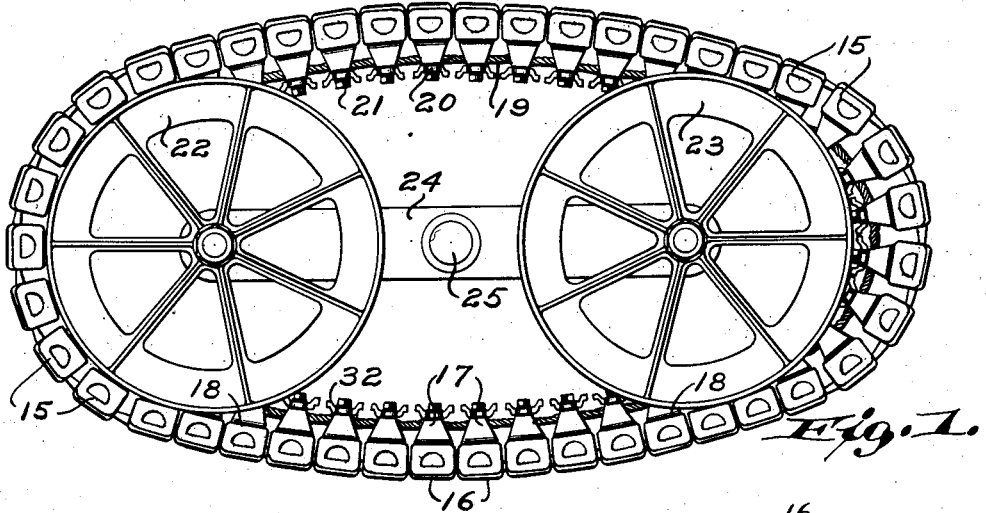
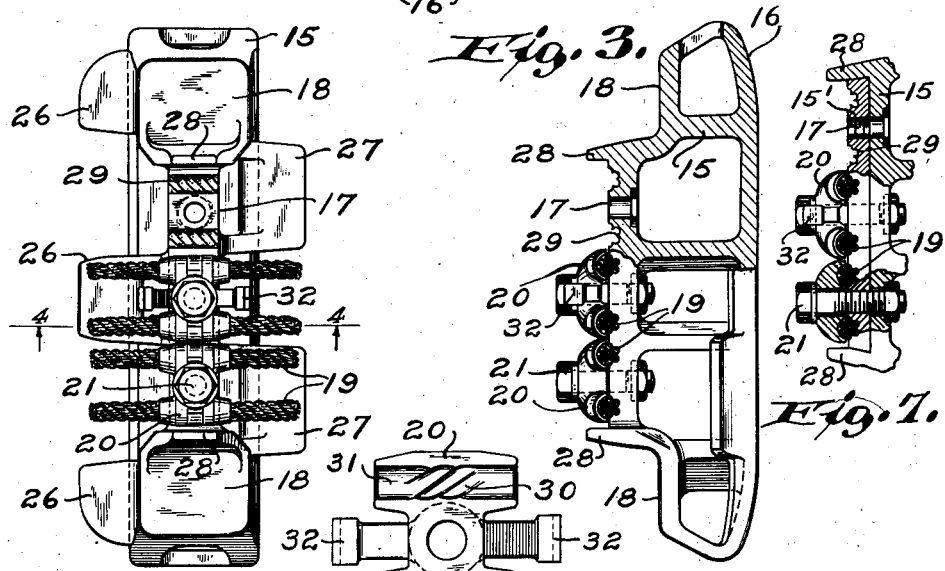
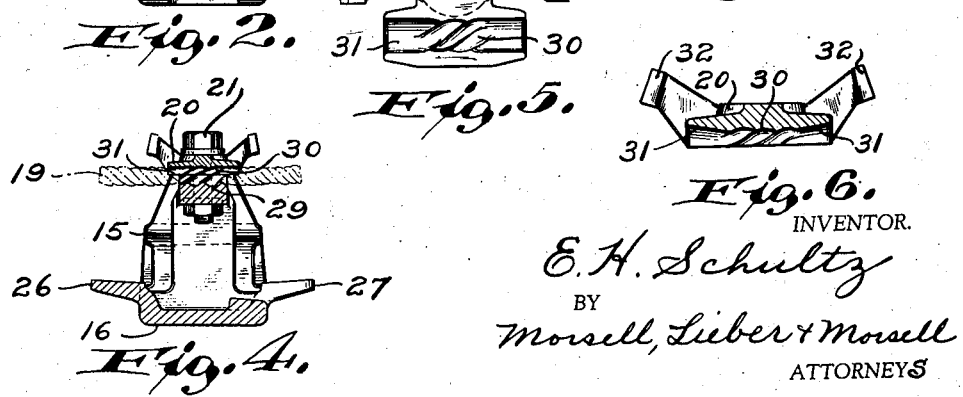
INVENTOR.
E. H. Schultz
BY
Morsell, Lieber + Morsell
ATTORNEYS Dec. 8, 1936.  E. H. SCHULTZ  2,063,762
ENDLESS TRACK STRUCTURE
Original Filed April 14, 1933  2 Sheets-Sheet 2
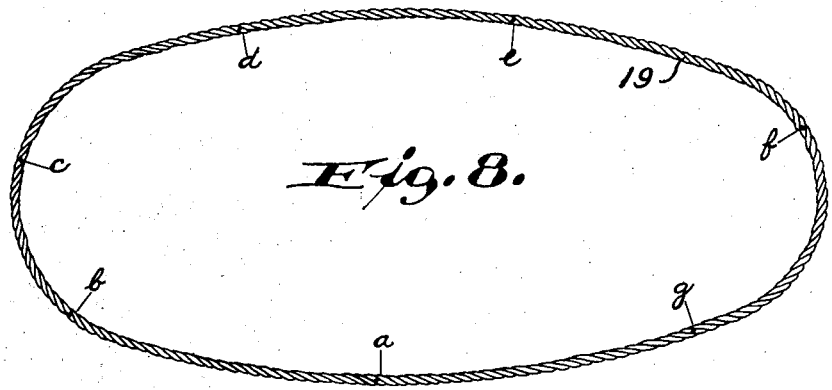
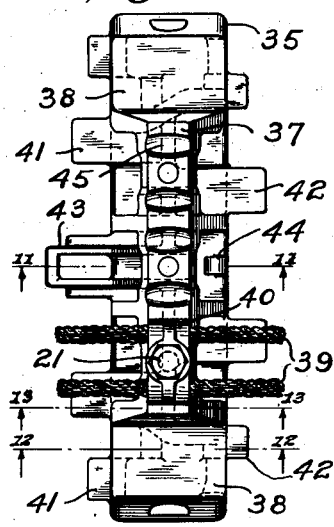
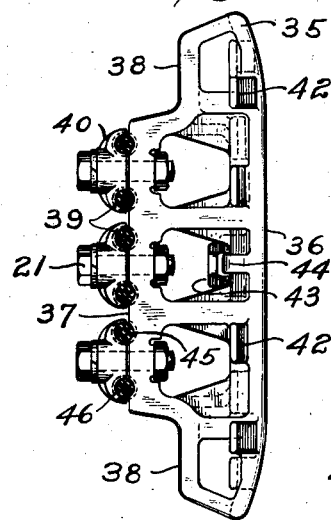
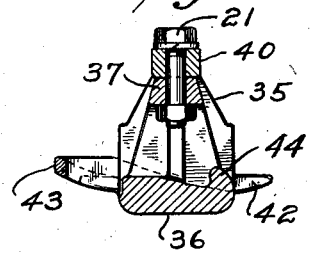
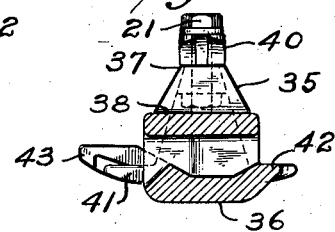
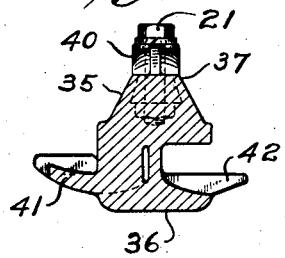
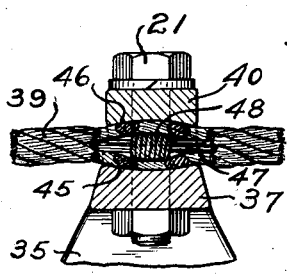
INVENTOR.
E. H. Schultz
BY
Monell, Lieber & Monell
ATTORNEYS.

Patented Dec. 8, 1936

2,063,762

UNITED STATES PATENT OFFICE 2,063,762

ENDLESS TRACK STRUCTURE

Edward H. Schultz, Milwaukee, Wis.

Application April 14, 1933, Serial No. 666,070
Renewed July 5, 1935

14 Claims. (Cl. 305—10)

The present invention relates in general to improvements in the art of transportation, and relates more specifically to improvements in the construction and operation of track laying structures for vehicles or the like.

Generally defined, an object of the invention is to provide improved vehicle track structure which is simple in construction and efficient in operation.

Numerous forms of so-called trussed or self-supported track-laying assemblages for vehicles, comprising an endless series of ground engaging treads coacting with the peripheries of spaced vehicle wheels and having lower stretches arched downwardly between the points of contact with the front and rear wheels, have heretofore been proposed. In the prior endless track structures of this general type, most commonly adopted, the arching in order to provide for easy pulling and the relative articulation of the track shoes, is produced by links and pivot pins connecting the successive treads, and even when the pivot elements are provided with special hardened pins and bushings and are protected against possible entry of grit, the parts become quickly worn and require frequent replacement. In addition to this objection, these prior pivoted truss types of structures are extremely complicated, cumbersome, noisy and expensive, thus making them relatively unsatisfactory.

It has also been heretofore proposed to utilize flexible endless tread connectors such as bands or cables, to join the successive individual treads of an ordinary track-laying structure wherein the entire lower stretch is flat and therefore cooperable with level ground, and in which the structure is not self-supporting when removed from the wheels or driving sprockets. Because of the inability to prevent stretching of the previously suggested endless connectors and to avoid slippage of the track shoes relative to the endless connecting bands or cables, these prior devices have not met with any degree of success, and no practical application of this type of connecting device to a truss type of track mechanism has heretofore been possible.

It is a more specific object of the present invention to provide an improved endless track assemblage of the trussed or self-supported type, wherein the use of journaled pivots is entirely avoided, and in which flexible tread connectors are successfully utilized as a trussing medium.

Another specific object of the invention is to provide an improved crawler type of track-layer which embodies a minimum number of simple parts, which can be readily manufactured and assembled, wherein the arch or camber may be readily renewed or altered, and which is durable in construction.

A further specific object of the invention is to provide a light but strong cable or band connected endless track of the trussed type, especially adapted for trailer service, which is sufficiently resilient to withstand the severest shocks to which it may be subjected, but wherein the shoes or treads are rigidly clamped to the flexible connecting cables or bands.

Still another specific object of the invention is to provide an endless track structure which is smooth and quiet in action, and which is moreover capable of high speed operation.

Another specific object of the invention is to provide an improved track layer having a minimum number of parts subjected to wear thus reducing the maintenance to a minimum, and which may be quickly and conveniently re-arched to vary the camber or shape of the supporting truss.

A further specific object of the invention is to provide an improved endless track mechanism wherein danger of clogging by loose ground or mud is materially reduced, and in which the tread connecting members are disposed remote from the tread surfaces.

Still another specific object of the invention is to provide an improved endless tread structure in which mis-alinement of the shoes is avoided, and wherein possible kinking or other undesirable displacement of the tread connectors is also eliminated.

Another specific object of the invention is to provide an improved clamp for rigidly connecting a wire cable or the like to an adjacent tread, while providing for distributed flexing of the cable.

A further specific object of the invention is to provide an improved cable splice whereby a length of wire cable may be made endless without materially impairing the tensile strength thereof, while maintaining the cross-sectional area substantially uniform throughout.

Still another specific object of the invention is to provide simple and effective means for preventing collapse of an endless track structure when the same is removed from its confining and propelling wheels.

Another specific object of the invention is to provide a flexibly connected track assemblage, wherein the flexible connectors serve both as hinges for the successive shoes when passing around the wheels, and as tension members for maintaining the lower track run in downwardly arched or cambered condition between the wheels.

A further specific object of the invention is to provide an improved interlocking shoe or tread construction for endless tracks, which may be readily formed and which is adapted to coact with adjoining shoes to provide a continuous tread surface.

Still another specific object of the invention is to provide an improved articulated endless tread structure wherein minimum opening between successive shoes occurs during normal operation and in which smooth rolling of the wheels in contact with the successive treads is assured.

Another specific object of the invention is to provide a new and useful endless track structure which may be manufactured and sold at minimum cost, and in which the cost of maintenance is relatively low.

These and other specific objects of the invention will be apparent from the following detailed description.

A clear conception of several embodiments of the improvement, and of the manner of constructing and of operating endless track mechanisms built in accordance with the invention, may be had by referring to the drawings accompanying and forming a part of this specification in which like reference characters designate the same or similar parts in the various views.

Fig. 1 is a side elevation of one embodiment of endless track structure wherein the successive shoes are flexibly interconnected by a series of wire cables, showing the track structure applied to a set of front and rear vehicle supporting wheels;

Fig. 2 is an enlarged top view of one of the track shoes showing fragments of four of the six connecting cables and two of the improved cable clamps;

Fig. 3 is a part sectional elevation looking at the side of the improved tread shoe, cables and clamps of Fig. 2;

Fig. 4 is a section through the improved shoe and clamp of Fig. 2, the section being taken along the line 4—4 of Fig. 2;

Fig. 5 is an enlarged bottom view of one of the improved cable clamps having side stops associated therewith;

Fig. 6 is a similarly enlarged section through the clamp of Fig. 5;

Fig. 7 is a longitudinal section through a fragment of a modified form of shoe structure;

Fig. 8 is a somewhat diagrammatic side elevation of one of the endless tread connecting cables, showing one method of splicing the same;

Fig. 9 is a full top view of a modified form of improved track shoe with two endless connecting cables and one cable clamp associated therewith;

Fig. 10 is a full side view of the shoe and cable clamp of Fig. 9;

Fig. 11 is a transverse section through the shoe and clamp of Figs. 9 and 10, taken along the line 11—11 of Fig. 9;

Fig. 12 is another transverse section through the shoe and clamp of Figs. 9 and 10, taken along the line 12—12 of Fig. 9;

Fig. 13 is still another transverse section through the shoe and clamp of Figs. 9 and 10, taken along the line 13—13 of Fig. 9;

Fig. 14 is an enlarged section through the cable clamping portion of the structure of Figs. 9 and 13 inclusive; and Fig. 15 is a similarly enlarged section through a further modified form of cable clamp.

While the invention has been illustrated and described herein as being specifically applied to a trailer type of endless track structure for vehicles, it is not intended to limit the scope by such specific disclosure, since some of the features are obviously more generally applicable to other forms of track laying mechanism.

Referring to Figs. 1 to 7 inclusive of the drawings, the crawler track structure comprises in general an endless series of track treads or shoes 15 each having an outer tread surface 16, an inner clamping portion 17, and a pair of intermediate rail portions 18 at the opposite ends thereof; a plurality of endless stranded cables 19 constituting laterally flexible members or continuous cable loops disposed within and adjacent to the series of shoes 15; clamps 20 including clamping bolts 21 for rigidly attaching the individual shoes 15 to the cables 19 at the shoe clamping portions 17; and horizontally spaced front and rear vehicle supporting wheels 22, 23 coacting with similarly spaced parts of or points along the endless track formed by the succession of rail portions 18 of treads. The wheels 22, 23, as shown in the assembly of Fig. 1, are rotatably journaled at the opposite ends of a frame 24 the central portion of which is swingably connected to the vehicle by a pivot 25, in a well-known manner.

The treads or shoes 15 may be constructed of cast or forged steel or other wear-resisting material, and each of these shoes has opposite side abutments, being provided with integral side lugs or projections 26 on one side extending outwardly beyond the adjacent abutment surface, and with similar but staggered side lugs or projections 27 on its opposite side also extending outwardly beyond the adjacent abutment surface, closely adjacent to the tread surface 16. These projections 26, 27 are adapted to inter-engage with recesses in the adjacent shoes 15 extending inwardly from the adjacent side abutments, to provide a substantially continuous ground engaging tread surface for the endless series, and the outer surfaces of the projections 26, 27 are slightly curved or inclined and are cooperable with similar surfaces on the adjacent shoes so as to prevent the formation of openings or gaps when relative articulation of the shoes occurs. The rail surfaces or portions 18 of the shoes 15 may be slightly dished to fit the peripheries of the wheels 22, 23, and the shoes 15 are provided near the rail portions with inwardly projecting integral tapered guide flanges 28 extending beyond the clamping portions 17.

The clamping portions 17 of the shoes 15, are formed with helical grooves 29 as shown in Figs. 2, 3, and 4, adapted to snugly fit the outer surfaces of the helical strands of the cables 19. The clamps 20 are also formed with helical grooves 30 as shown in Figs. 5 and 6, adapted to cooperate with the shoe grooves 29 and to snugly fit the cable strands on the opposite sides of the cables 19, so that when the clamping bolts 21 are applied, the shoes 15 cannot move or slip along the cables. Each of the clamps 20, is adapted to coact with one or more cables 19, and the end portions 31 of the cable clamping grooves are preferably inclined in the plane of flexing of the cable and rounded as shown in Fig. 6 in order to prevent abrupt bending of the cables at the opposite ends of the helical grooves 30. The central clamp 20 of each set, is also provided with integral stops 32 as clearly shown in Figs. 1, 2, and 4, and these stops are cooperable with the stops 32 of the adjoining clamps 20 in order to limit the relative movement of the shoes 15 due to flexing of the intervening portions of the cables 19.

While the tread structure specifically illustrated, utilizes six endless cables 19, more or less of these cables may be utilized, and other forms of flexible members may obviously be substituted for the cables. The clamping of the shoes 15 to the cables 19, is preferably such, that the distance between the centers of the successive clamps 20 is slightly less than the distance between the centers of the corresponding shoes 15 near the tread portion 16. Such assemblage obviously produces outward curvature of the endless track at the upper and lower runs thereof and makes the structure self-supporting when removed from the wheels 22, 23. The degree of arching or camber in order to provide for easy pulling, may obviously be varied by merely changing the distance between the centers of the successive clamps 20, since the distance between the centers of the shoes 15 at the tread surfaces 16 remains practically constant. With the track structure thus assembled, the portions of the cables 19 between the successive clamps 20, are subjected only to tension at the lower and upper arches, and serve as hinges when the track advances around the wheel peripheries. The stops 32 serve to prevent the end bends of the endless assemblies from being reversely bent by externally applied pressure. Upon removal of the track structure from the wheels 22, 23, the stops 32 also become effective to prevent outward collapse of the structure at the end bends, and the lower and upper arches act as trusses to prevent collapse of the lower and upper runs, in precisely the same manner as when the track is applied to the wheels. It is also to be noted, that when the structure is fully assembled and operating as in Fig. 1, the front and rear wheels 22, 23 float between the curved end bends of the endless rails, so that the lower and upper camber may vary to some extent due to lodging of dirt between the successive shoes near the tread surfaces 16, without varying the distance between the wheels 22, 23.

As shown in Fig. 7, the upper portion 15' of each shoe 15 may be made separable from the shoe proper, so that the cables 19, clamps 20 and shoe portions 15' may be assembled at the factory independently of the shoes by means of the clamping bolts 21, and the shoes subsequently applied to the assemblage by means of the same bolts 21 and the clamping nuts coacting therewith. Such a structure may greatly facilitate accurate spacing of the clamps 20 along the cables and assembly of the complete track structure in the field, and will also facilitate replacement of shoes. With this modified structure, the cable loops with the clamps 20 and shoe portions 15' attached thereto, may be bodily removed from the shoes 15, as a unit and independently of the interfitting shoe portions or projections 26, 27.

In order to insure maximum strength and durability of the stranded endless cables 19, these cables may be constructed of material having pre-formed outer helical strands surrounding a central straight core strand, as shown in Fig. 3, and the splicing of the cable may be effected as shown in Fig. 8. In this diagram, the six individual outer helical strands and the core strand are caused to abut endwise at different points marked $a$, $b$, $c$, $d$, $e$, $f$, and $g$, throughout the length of the cable 19, thus retaining at least six-sevenths of the normal maximum tensile strength of the cable at any section thereof. While the abutting adjacent ends of the several strands may be soldered, welded, or otherwise attached to each other, such permanent interconnection is not essential, since the clamps 20 will effectively prevent possible separation of the strand ends in the finally assembled structure. The adjacent cables 19 are spliced in like manner, and since there are six cables each having seven strand splices, there are forty-two strand splices in all. In assembling the track structure, the cables 19 should be so positioned relative to each other, that of the three clamps 20 coacting with any one of the individual shoes 15, only one will coact with a strand splice of a cable 19 while the other cables 19 coacting with the same shoe will have full section and normal strength at the corresponding clamps 20. Since there are forty-three shoes and only forty-two strand splices, such assembly is readily possible, and maximum strength is thereby assured. When the clamps 20 have been applied, the strand splices are located centrally within the clamping grooves 29, 30 and are firmly gripped therein, so that all unclamped portions of all cables 19 have full section and strength.

The mode of constructing, assembling, and of operating the improved track structure just described, should be clearly apparent from the description, and when the vehicle is being dragged or propelled along the ground, the front wheels 22 are rotating and are rolling along the shoe rail portions 18 thus causing the lower run of the endless track to move in a direction opposite to the direction of advancement of the vehicle. The tread surfaces 16 of the endless track structure are thus caused to crawl along the ground surface in arched formation, and this action continues as long as the vehicle is moving. The mechanism is obviously operable in either direction, and the vehicle may be reversed at will, but the endless track is free to float relative to the wheels 22, 23. When the track structure is assembled with or removed from the wheels 22, 23, the stops 32 will function as previously described, to prevent inward or outward collapse of the track assemblage at the end bends. The lower camber of the track assembly acts in a manner similar to a round wheel of very large diameter, and thereby provides for easier pulling of the vehicle, than is possible with a flat ground engaging surface.

Referring specifically to Figs. 9 to 14 inclusive, the modified shoe structure disclosed therein is capable of being assembled to produce an endless track, precisely as in the previously described case and as shown in Fig. 1. In the modified construction, the shoes 35 are again formed of steel or the like, and each shoe 35 is provided with an outer tread surface 36, an inner clamping portion 37, and with intermediate rail portions 38 at the shoe ends. The successive shoes 35 are likewise flexibly connected by means of cables 39 of modified construction, which may be spliced in a manner similar to that shown in Fig. 8. The cable clamps 40 are also of modified construction and are adapted to be fastened to the shoes 35 with ordinary bolts 21 and lock washers as previously described.

Each of the modified shoes 35 has a number of integral front projections 41 and relatively staggered rear projections 42, which are adapted to cooperate with recesses in the adjacent shoes 35 to prevent mis-alinement of the track structure during articulation of the shoes. Each shoe 35 is also provided with a special forward lug 43 having an opening therethrough, and with an integral projection 44 disposed rearwardly of the lug 43 and engageable with the opening in the lug 43 of the adjacent shoe 35 to limit the relative swinging movement of the shoes due to flexing of the cables 39. The projections 41, 42 and the lugs 43 are preferably located closely adjacent to the surface 36, and may be curved to fit similarly curved surfaces of the shoe recesses, in order to prevent the formation of open gaps between the successive shoes at the tread surface.

The clamping portions 37 of the shoes 35 are again disposed remote from the tread surfaces 36, and are provided with bulged grooves 45 as clearly shown in Figs. 9 and 14. The clamps 40 may be provided with cooperating bulged grooves 46, and the inner central strand 47 of each cable 39 may be bulged by swaging or by wrapping wires 48 thereabout at equal intervals, in order to produce a succession of enlargements on the cable. The wire 48 may be soldered, brazed, welded, swaged, or otherwise attached to the inner strand or to the exterior of the cable, and the distance between successive bulges on the cables 39 should be equal to the final distance between the centers of the clamps 40 of the successive shoes 35, in the assembled track structure. With the cables 39 properly constructed, the successive bulged or enlarged portions may be disposed within the bulged recesses or grooves 45, 46 of the shoes 35 and clamps 40 respectively, and firmly locked therein by fastening the bolts 21 in place. The final structure produced with the shoes 35 will also have outwardly arched upper and lower runs, and will be self-supporting when removed from the vehicle wheels, by virtue of the coaction of the projections 44 with the through openings of the central lugs 43.

Referring specifically to the modified clamping arrangement of Fig. 15, the shoe clamping portion 57 is provided with recesses or grooves 66 having integral flanges at the opposite ends thereof, and the clamps 60 are provided with cooperating recesses or grooves 67 having similar flanges at the ends thereof. The cables 59 are of the stranded type, and have cylindrical collars 58 rigidly attached thereto at equally spaced intervals, by welding, swaging, shrinking or otherwise. The successive cable collars 58 are adapted to fit within the grooves 66, 67 of the shoes and clamps respectively, between the end flanges of the grooves, so that when the clamping bolts 21 are applied, the shoe clamping portions 57 will be firmly locked to the cables 59 and will be held against displacement longitudinally of these cables.

The mode of constructing, assembling and of operating endless track structures built in accordance with the modifications of Figs. 9 to 15 inclusive, is the same as described in connection with Figs. 1 to 7 inclusive, and should be readily apparent from the foregoing description.

From the foregoing description of the several embodiments of the invention disclosed herein, it will be apparent that the improvement fully attains the primary object of providing an improved cambered track structure which is simple in construction and efficient in operation. The track structure comprises only a series of similar shoes each having one or more clamps associated therewith, and one or more flexible members such as cables rigidly attached to portions of the shoes remote from the tread surfaces thereof, thus reducing the number of elements to a minimum. The endless track structure is moreover self-supporting and the degree of camber or arching of the ground coacting run of the structure, may be conveniently varied as desired to produce easy running with minimum power consumption. The elimnation of journaled pivots in the improved structure, obviously makes it unnecessary to provide hardened joint elements, and the specific mode of attaching the flexible members to the shoes insures maximum life for these members. The flexible members or cables may also be readily replaced when necessary, and the improved method of splicing the cables insures maximum strength at all portions thereof. All of the elements may be readily manufactured and assembled to produce an extremely durable structure which is far more compact and quieter in operation than any other known mechanism of the same general class. The several forms of clamps illustrated and described herein serve to effectively lock the shoes to the cables without weakening the cables at the connections, and the construction of the shoes is such that clogging of the assemblage by loose ground or mud is substantially eliminated. The cables or flexible members are moreover located remote from the ground engaging surface, and may be disposed centrally of or near the ends of the shoes, and by forming the stops between adjacent shoes, directly upon the clamps, the shoe construction may be greatly simplified. These stops may obviously be located either above or below the cables, as illustrated in the several specific embodiments. The side flanges 20, beside insuring proper guiding of the track upon the vehicle supporting wheels, also enhance the wearing surface and protect the cable clamps, and the use of lock washers with the clamping bolts 21 prevents these bolts from becoming loose and thereby destroying the clamping effect. The use of separable clamping portions as in Fig. 7, also facilitates assembly. The side lugs on the shoes cooperating with recesses in the adjacent shoes, besides preventing the formation of gaps between adjoining shoes, also serve to maintain the successive shoes in proper alinement.

It should be understood that it is not desired to limit the invention to the exact details of construction and to the precise mode of operation herein shown and described, for various modifications within the scope of the claims may occur to persons skilled in the art.

It is claimed and desired to secure by Letters Patent:

1. In combination, an endless series of mutually coacting shoes forming a tread surface and having interfitting portions near said surface, a plurality of laterally flexible cable loops disposed within said series remote from said surface, and a clamp rigidly connecting each cable loop to each shoe, the distance between centers of the successive clamps being less than the distance between centers of the successive corresponding shoes near said tread surface when the shoes are nearest each other at points adjacent said surface.

2. In combination, an endless series of shoes forming a substantially continuous tread surface and each having lugs coacting with recesses in the adjoining shoe near said surface, a plurality of laterally flexible cable loops disposed within said series remote from said surface, and a clamp rigidly connecting each cable loop to each shoe, the distance between centers of the successive clamps being less than the distance between centers of the successive corresponding shoes near said tread surface when the shoes are nearest each other at points adjacent said surface.

3. In combination, an endless series of mutually coacting shoes forming substantially continuous concentric tread and rail surfaces and having interfitting portions between said surfaces, a plurality of laterally flexible cable loops disposed within and remote from said tread surface, and a clamp rigidly connecting each cable loop to each shoe, the distance between centers of the successive clamps being less than the distance between centers of the successive corresponding shoes near said tread surface when the shoes are nearest each other at points adjacent one of said surfaces.

4. In combination, an endless series of shoes forming substantially continuous concentric tread and rail surfaces and each having lugs coacting with recesses in the adjoining shoe between said surfaces, a plurality of laterally flexible cable loops disposed within and remote from said tread surface, and a clamp rigidly connecting each cable loop to each shoe, the distance between centers of the successive clamps being less than the distance between centers of the successive corresponding shoes near said tread and rail surfaces when the shoes abut each other at points adjacent one of said surfaces.

5. In combination, an endless series of mutually coacting shoes forming a tread surface and having interfitting portions near said surface, a plurality of laterally flexible cable loops disposed within said series remote from said surface, and a series of clamps rigidly connecting each of said cable loops to each shoe, all of said clamps and cable loops being bodily removable as a unit from said shoes independently of said interfitting shoe portions.

6. In combination, an endless series of mutually coacting shoes forming substantially continuous concentric tread and rail surfaces and having interfitting portions between said surfaces, a plurality of laterally flexible cable loops disposed within and remote from said tread surface, and a series of clamps rigidly connecting each of said cables to each shoe independently of said interfitting shoe portions, all of said clamps and cable loops being bodily removable from said shoes as a unit.

7. In combination, a series of mutually coacting shoes forming a tread surface, a plurality of spliced stranded cable loops disposed within said series remote from said surface, and a series of clamps rigidly connecting each of said cables to each shoe, only one strand of each cable loop being parted at any point throughout the length thereof and each of said strand partings being confined within a different clamp of the entire series.

8. In combination, an endless series of mutually coacting shoes forming a tread surface and having interfitting portions near said surface, a plurality of laterally flexible loop members disposed within said series remote from said surface, and attaching means rigidly connecting each loop member with each shoe, the distance between centers of the successive attaching means being less than the distance between centers of the successive corresponding shoes near said tread surface when the shoes are nearest each other at points adjacent said surface.

9. In combination, an endless series of shoes forming a substantially continuous tread surface and each having lugs coacting with recesses in the adjoining shoe near said surface, a plurality of laterally flexible loop members disposed within said series remote from said surface, and a clamp rigidly connecting each loop member to each shoe, the distance between centers of the successive clamps being less than the distance between centers of the successive corresponding shoes near said tread surface when the shoes are nearest each other at points adjacent said surface.

10. In combination, an endless series of mutually coacting shoes forming substantially continuous concentric tread and rail surfaces and having interfitting portions between said surfaces, a plurality of laterally flexible loop members disposed within and remote from said tread surface, and a clamp rigidly connecting each loop member to each shoe, the distance between centers of the successive clamps being less than the distance between centers of the successive corresponding shoes near said tread surface when the shoes are nearest each other at points adjacent one of said surfaces.

11. In combination, an endless series of shoes forming a substantially continuous tread surface, adjoining shoes of said series having cooperating abutments near said surface which are movable toward and away from each other and which engage when said adjoining shoes are nearest each other, a plurality of laterally flexible loop members disposed within said series remote from said surface, and attaching means connecting each member to each shoe, the distance between centers of the successive attaching means being less than the distance between centers of the successive corresponding shoes near said tread surface when the complementary shoe abutments are in engagement.

12. In combination, an endless series of shoes forming a substantially continuous tread surface, adjoining shoes of said series having cooperating abutments near said surface which are movable toward and away from each other and which engage when said adjoining shoes are nearest each other, spaced laterally flexible loop members disposed within said series remote from said surface, attaching means connecting each member to each shoe, the distance between centers of the successive attaching means being less than the distance between centers of the successive corresponding shoes near said tread surface when the complementary shoe abutments are in engagement, and means for preventing relative shifting of the adjacent shoes laterally of said members.

13. In combination, an endless series of shoes forming a substantially continuous tread surface and each having an abutment engageable with a similar abutment on the adjoining shoe near said surface, a plurality of laterally flexible loop members disposed within said series remote from said surface, attaching means connecting each member to each shoe, the distance between centers of the successive attaching means being less than the distance between centers of the successive corresponding shoes near said tread surface when the complementary shoe abutments are in engagement, and means providing stops adjacent to said loop members for limiting the extent of separation of said shoes at said abutments by virtue of the flexing of said members.

14. In combination, an endless series of shoes forming a substantially continuous tread surface, a plurality of laterally flexible loop members disposed within said series remote from said surface, attaching means connecting each member to each shoe, the distance between centers of the successive attaching means being less than the distance between centers of the successive corresponding shoes near said tread surface, and means providing abutments near said members for limiting the swinging movement of adjacent shoes by virtue of the flexibility of the interconnecting members.

EDWARD H. SCHULTZ.